Figure 1:
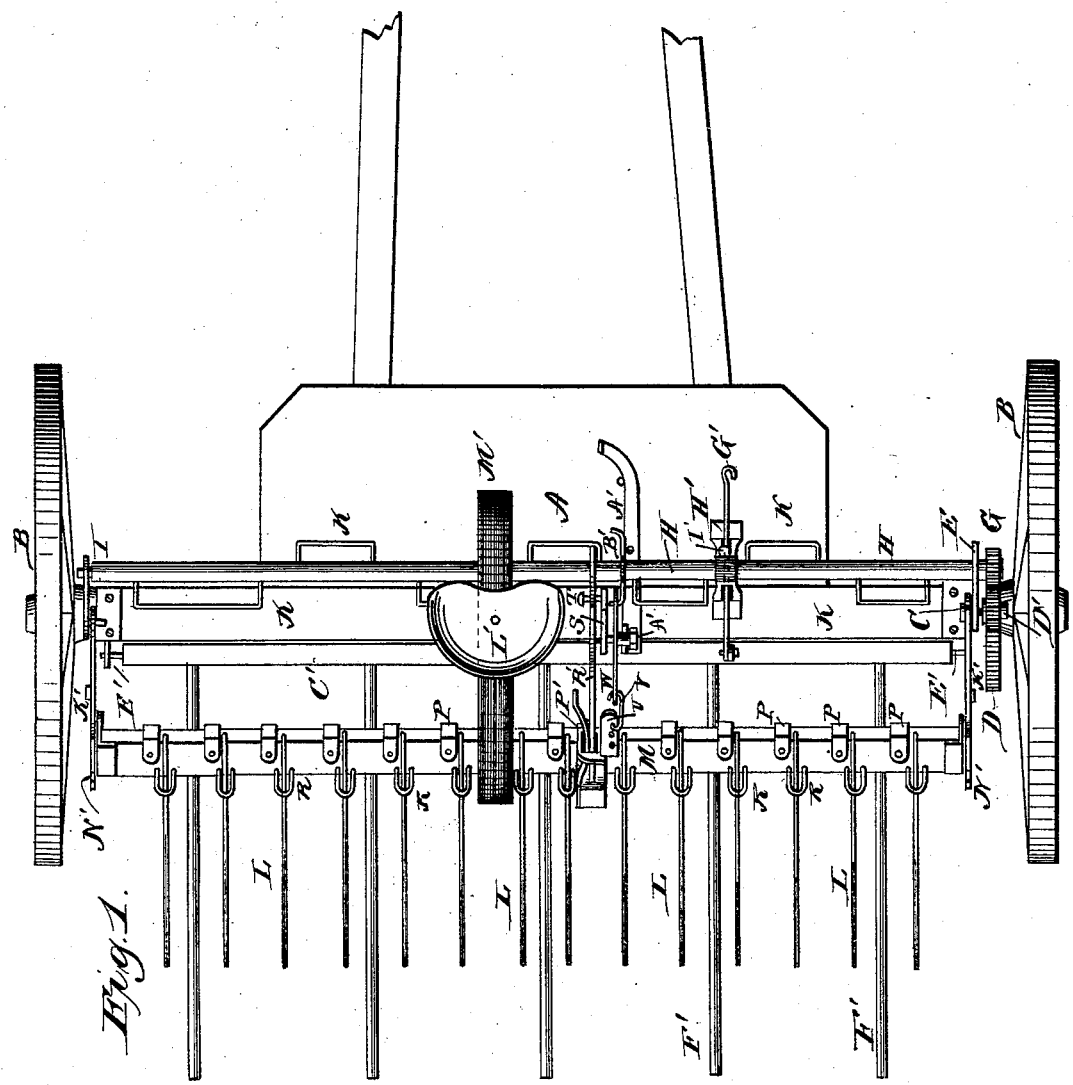

(No Model.)　　　　　　　　　　　　　　　　2 Sheets—Sheet 1.

I. L. LANDIS.
HAY RAKE AND TEDDER.

No. 248,185.　　　　　　　　　Patented Oct. 11, 1881.

Witnesses,　　　　　　　　　　　Inventor
Franck L. Ouraud,　　　　　　　Israel L. Landis
H. Aubrey Faulmm　　　　　　By Alexander Mason
　　　　　　　　　　　　　　　　　atty (No Model.) 2 Sheets—Sheet 2.
I. L. LANDIS.
HAY RAKE AND TEDDER.
No. 248,185. Patented Oct. 11, 1881.
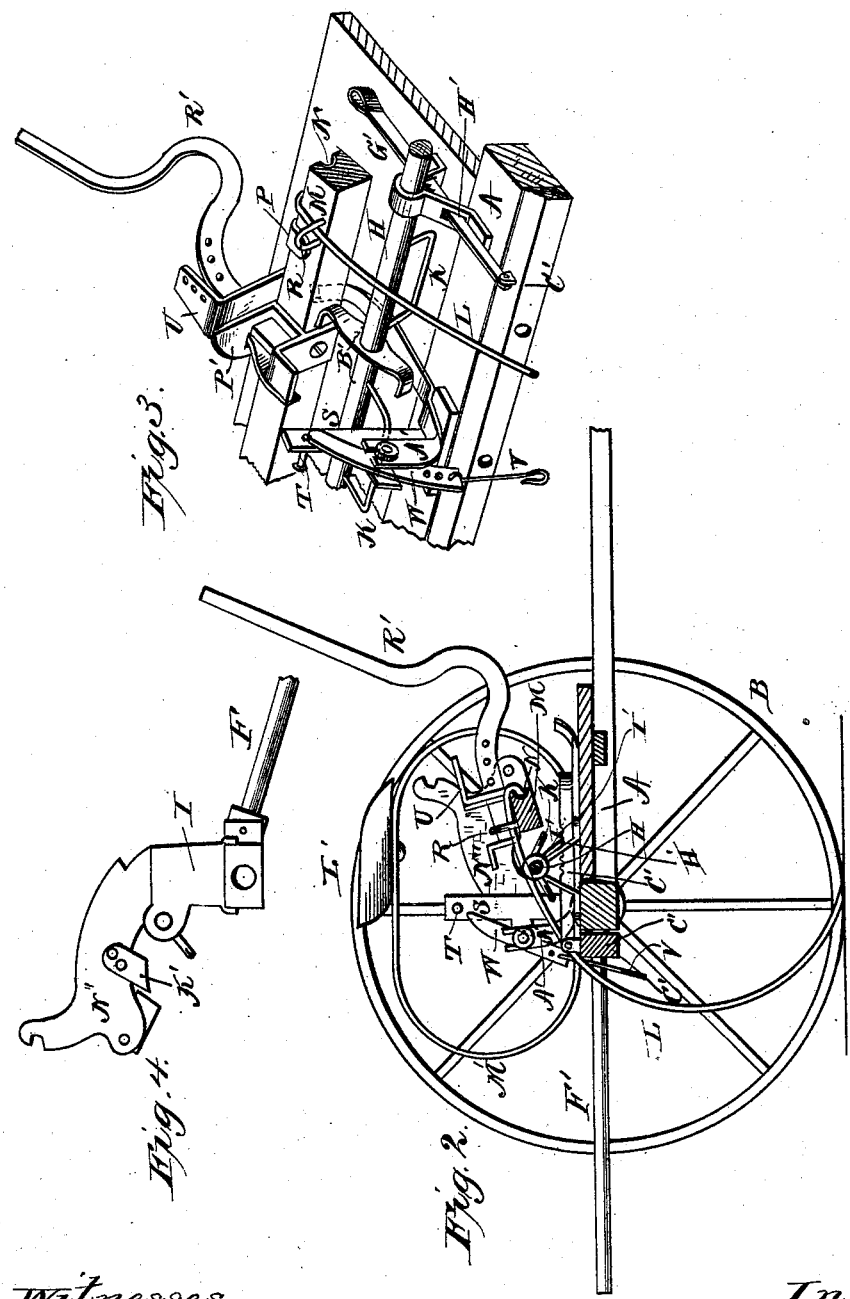

UNITED STATES PATENT OFFICE.

ISRAEL L. LANDIS, OF LANCASTER, PENNSYLVANIA.

HAY RAKE AND TEDDER.

SPECIFICATION forming part of Letters Patent No. 248,185, dated October 11, 1881.

Application filed February 7, 1881. (No model.)

*To all whom it may concern:*

Be it known that I, ISRAEL L. LANDIS, of Lancaster, in the county of Lancaster, and in the State of Pennsylvania, have invented certain new and useful Improvements in Hay Rakes and Tedders; and I do hereby declare that the following is a full, clear, and exact description thereof, reference being had to the accompanying drawings, and to the letters of reference marked thereon, making a part of this specification.

This invention relates to an improved hay rake and tedder; and it has for its objects to provide whereby the teeth may be readily shifted, so as to throw them into proper position for raking or tedding, as may be desired, and to provide suitable mechanism for operating the teeth when the apparatus is employed as a tedder, and for automatically lifting the teeth simultaneously when employed as a rake, to automatically discharge the load, as more fully hereinafter specified. These objects I attain by the apparatus illustrated in the accompanying drawings, in which—

Figure 1 represents a top view of my apparatus entire. Fig. 2 represents a sectional view of my apparatus; Fig. 3, a detached detail view of a portion of my apparatus; and Fig. 4, a detached detail view, showing one of the supports of the rake-carrying bar.

The letter A indicates the frame of my apparatus, which is mounted on the wheels B, as usual. One of the said wheels carries a gear-wheel, D, intermeshing with an idler-pinion, D', mounted on a short shaft, C, projecting from the standard E, secured to the frame A. The said idler-pinion intermeshes with a pinion, G, on the end of the lifter-shaft H, which is journaled at one end in the standard E, and at the other end in a bearing, I, secured to the frame A. The said shaft is provided with a series of lifters, K, which serve to operate the teeth L when the apparatus is employed as a tedder.

The letter M indicates the bar which carries the teeth of the apparatus. The said teeth are bent at their confined ends, as indicated, the bent portions being secured in a longitudinal groove, N, in the bar M by means of the clips P in such manner that they may oscillate freely when required. The teeth extend through the loops or staples R, which serve to limit their movement and guide them as they are operated; but instead of such loops or staples the rake-carrying bar may be provided with a longitudinal board at its rear upper edge, provided with suitable slots, through which the teeth extend, and which guide the teeth and limit their movement. The bar M at its ends is journaled in suitable bearings in the swinging arms N', pivoted to the standards at opposite sides of the frame of the apparatus in such manner that the said bar may be swung to the rear of the apparatus, as indicated in Fig. 1, when it is desired to employ the apparatus as a rake, or may be swung forward, as shown in Fig. 2, as will be more fully hereinafter explained. The rake-tooth bar, about midway between its ends, is provided with slotted standards P', which carry an adjustable lever, R', which may be adjusted in such manner that it may be under convenient control of the driver in whatever position the tooth-bar may be placed, so as to enable the driver to elevate or depress the teeth at will.

The letter S indicates a standard secured to the frame, which is provided with a pin, T, at its upper end, with which the lever R' is adapted to engage when the tooth-bar is thrown back, so as to hold said bar and the teeth in proper position for raking. The tooth-bar is also provided about midway between its ends, near the standards P', with a bracket, U, which is provided with a series of perforations adapted to receive one end of a link, V, connecting with a trip-lever, W, fulcrumed to the upper end of a foot-lever, A', which is fulcrumed to the frame of the apparatus in such manner that the trip-lever may be shifted, so as to be thrown into or out of the way of an arm, B', on the lifter-shaft, which serves to trip the said lever W at proper intervals, so as to elevate the rake-teeth and automatically dump the load.

The letter C' indicates the bar carrying the clearer-teeth. This bar is pivoted at E' to the frame of the apparatus in such manner that the clearer-teeth F' may be elevated or depressed at will. The said bar C' is provided with a pivoted link, G', having a series of serrations on its upper edge. The said link passes through slots in the standard H' to the forward part of the frame, so as to be under the control of the driver, so that he can elevate or depress the clearers at will.

The letter I' indicates a dog or pawl pivoted to the standard H', which is adapted to engage the serrations on the link G' to hold the clearers in any desired position. The arms which carry the bar to which the rake or tedder teeth are attached are provided with lugs K', which are adapted to rest against the forward edges of the standards when the apparatus is in position to be used as a tedder, and support the said bar in position.

The letter L' indicates the driver's seat, which is mounted on a spring, M', extending over the rake-tooth bar and the lifter-shaft, being secured to the frame of the apparatus. The said seat is so mounted that it may rotate freely to enable the driver to readily change his position.

The operation of my apparatus is as follows: When the apparatus is to be employed as a rake the bar carrying the rake or tedder teeth is thrown back, as indicated in Fig. 1 of the drawings, being held in position by engaging the hand-lever with the pin on the standard before mentioned. When in this position the rake may be elevated so as to dump the load by simply manipulating the hand-lever. By connecting the bracket on the tooth-bar with the trip-lever by means of the link provided for the purpose and throwing the trip-lever into proper position by shifting the foot-lever, the trip-lever will be operated at proper intervals by the arm on the lifter-shaft in such manner as to dump the rake automatically. The tooth-bar when the apparatus is to be employed as a tedder is thrown into the position as shown in Fig. 2, bringing the teeth directly over the lifters, so as to be operated thereby as the lifter-shaft is rotated. The clearer-teeth, as before mentioned, are adjusted by means of the link secured to the lifter-bar.

Having thus fully described my invention, what I claim, and desire to secure by Letters Patent, is—

1. In combination with the frame of the apparatus, the bar carrying the rake or tedder teeth secured to the arms pivoted to the sides of the frame and adapted to be shifted back or forth, to adapt the apparatus to serve as a rake or tedder, substantially as specified.

2. In combination with the bar carrying the rake or tedder teeth secured to the frame of the apparatus, as described, the lifter-shaft and mechanism for operating the same, substantially as specified.

3. In combination with the rake or tedder teeth and the bar carrying the same, the trip-lever adapted to be connected with said bar, and the arm secured to the lifter-shaft, whereby the rake may be automatically dumped at proper intervals.

4. In combination with the bar carrying the clearing-teeth, the link secured to the same, provided with teeth and extending through a slotted standard on the frame of the apparatus, the said frame being provided with a dog or pawl adapted to engage the teeth on the bar and hold the clearer in any desired position, substantially as specified.

In testimony that I claim the foregoing I have hereunto set my hand this 17th day of January, 1881.

ISRAEL L. LANDIS.

Witnesses:
H. AUBREY TOULMIN,
C. A. NEALE.